United States Patent
Brun et al.

(10) Patent No.: US 7,124,008 B2
(45) Date of Patent: Oct. 17, 2006

(54) SYSTEM FOR IN-SITU CONTROL OF THE ORIENTATION OF A VEHICLE HEADLAMP AND PROCESS FOR ITS IMPLEMENTATION

(75) Inventors: Norbert Brun, Bobigny Cedex (FR); Joël Leleve, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 211 days.

(21) Appl. No.: 10/730,829

(22) Filed: Dec. 8, 2003
(Under 37 CFR 1.47)

(65) Prior Publication Data
US 2004/0178738 A1    Sep. 16, 2004

(30) Foreign Application Priority Data
Dec. 9, 2002  (FR) .................................. 02 15874

(51) Int. Cl.
*B60Q 1/04*    (2006.01)
*B60Q 1/115*    (2006.01)
(52) U.S. Cl. ........................................ 701/49; 362/466
(58) Field of Classification Search .................... None
See application file for complete search history.

(56) References Cited

U.S. PATENT DOCUMENTS

| 4,620,267 | A | * | 10/1986 | Cibie ........................ 362/466 |
| 5,359,666 | A | | 10/1994 | Nakayama |
| 5,633,710 | A | * | 5/1997 | Kumra et al. .......... 356/139.08 |
| 6,144,159 | A | | 11/2000 | Lopez et al. |
| 6,547,425 | B1 | * | 4/2003 | Nishimura .................. 362/466 |
| 6,709,135 | B1 | | 3/2004 | Couillaud et al. |
| 6,960,005 | B1 | * | 11/2005 | Daicho et al. .............. 362/466 |
| 2002/0075691 | A1 | * | 6/2002 | Couillaud et al. .......... 362/465 |

FOREIGN PATENT DOCUMENTS

| DE | 19602005 | 8/1996 |
| EP | 1202498 | 5/2002 |

* cited by examiner

*Primary Examiner*—Michael J. Zanelli
(74) *Attorney, Agent, or Firm*—Morgan & Finnegan, LLP

(57) ABSTRACT

The invention relates to a system for in-situ control of the orientation of a vehicle headlamp equipped with a light source fixed on a mobile reflector, and including a camera mounted in the vehicle, an image processing unit connected to the camera, and a specific light point emission device. It also relates to a process for in-situ control of the orientation of a vehicle headlamp, wherein it includes the following operations: recording of successive images of a scene extending in front of the vehicle, processing of at least one image of the scene and production of a processed image, determination, from this processed image, of a horizon line of the scene, determination of a specific point in the scene located at a pre-defined distance D from the horizon line, adjustment of the headlamp until this specific point is located in the light beam emitted by the headlamp.

15 Claims, 2 Drawing Sheets

SYSTEM FOR IN-SITU CONTROL OF THE ORIENTATION OF A VEHICLE HEADLAMP AND PROCESS FOR ITS IMPLEMENTATION

FIELD OF THE INVENTION

The invention relates to a system to control the orientation of a vehicle headlamp in-situ, providing constant illumination of the road irrespective of the attitude of the vehicle. The invention also relates to a process enabling this control system to be implemented.

The invention finds applications in the field of road vehicles such as, for example, cars or heavy goods vehicles. In particular, it finds applications in the field of light projection by these vehicles onto the road.

PRIOR ART

Currently, all vehicles travelling on the road include a device for illumination of the road used particularly at night or in bad weather. Conventionally, cars are equipped with two types of lighting: lighting termed "high beam" which illuminates the entire road over a long distance, and lighting termed "low beam" which illuminates the road over a short distance to avoid dazzling drivers of vehicles which may be travelling in the opposite direction. High-beam lighting is provided by means of high-beam headlights each of which sends out a beam of light directed toward the horizon. Low-beam lighting is provided by means of low-beam headlights, also called "code lights", each of which sends out a descending beam of light giving visibility over a distance in the order of 60 to 80 metres.

In the case of low-beam lighting, the illumination range is adjusted by orienting the headlamps in the vertical plane. Conventionally, the orientation of the light beam emitted by the low-beam headlamps is adjusted by specialists, in particular vehicle mechanics, based on instructions given by the lighting system manufacturer. The angle of orientation of the light beam is given by the manufacturer in radian percentage. This orientation angle of the light beams is given for a vehicle in a standard position. The "standard position" of the vehicle is the position in which the vehicle chassis is substantially parallel to the road, i.e. the angle formed by the vehicle chassis with the horizontal plane is flat. In this case, it is said that the attitude of the vehicle is flat.

However, it is known that the attitude of the vehicle can be modified in relation to the operating condition of the vehicle (acceleration, braking, etc) and in relation to the vehicle load. In effect, when the vehicle is heavily loaded the rear of the vehicle is lowered, which therefore means that the front of the vehicle is raised. The vehicle is therefore no longer parallel to the road. The vehicle is then familiarly described as being "nose up". In this case, the light beams of the vehicle's low-beam headlamps are directed toward the horizon, instead of being directed toward the road. They are then liable to dazzle the drivers of vehicles coming in the opposite direction.

On the other hand, when the vehicle is braking, the front of the vehicle tilts down toward the road. The vehicle is therefore no longer parallel to the road. The vehicle is then familiarly described as being "nose down". In this case, the light beams of the low-beam headlamps illuminate the road just in front of the vehicle. The driver of the vehicle then no longer has sufficient visibility to properly judge the road conditions.

It can thus be appreciated that the initial setting of the low-beam headlamps adjusted for a vehicle in the standard position is not correct when the attitude of the vehicle is no longer flat, that is to say when the vehicle is nose up or nose down.

To overcome this drawback, certain vehicles are equipped with an automatic correction system mounted on the vehicle chassis. This automatic correction system includes sensors placed on the front and rear axles of the vehicle and which each measure the height difference between the position of the wheel and the chassis, in relation to the vehicle load. A small computer built into the automatic correction system is used to determine the attitude of the vehicle and to provide information to small motors which orient the headlamp. However, this system has a number of drawbacks. For example, the sensors are placed close to the wheels, i.e. in locations that are poorly accessible for humans or robots during manufacture of the vehicle. Thus, the operation to fit the sensors during manufacture of the vehicle calls for a high degree of precision, and consequently entails significant investment of time and money. Moreover, these sensors are located in positions exposed to water splashes, loose chippings and other elements which may be present on the road. The electrical connections for these sensors, and the sensors themselves, must therefore be robust in order to withstand these effects.

SUMMARY OF THE INVENTION

The object of the invention is precisely to remedy drawbacks of the system described above. To this end, the invention proposes an intelligent system to control the orientation of the headlights of a vehicle is situ based on a camera and with reference to a specific point of the light beam in relation to the attitude of the vehicle. This system involves mounting a camera on the vehicle, or using a camera already in place on the vehicle, to film the road extending in front of the vehicle. An image processing unit then processes at least one or two images in order to determine the horizon line of the scene in front of the vehicle. From this horizon line, it is possible to identify a specific point in the scene, then to adjust the headlamp until a specific point of light emitted by a light source mounted on the headlamp reflector coincides with the specific point.

More precisely, the invention relates to a system to control the orientation in situ of a vehicle headlamp equipped with a fixed light source on a mobile reflector, wherein it includes a camera mounted in the vehicle, an image processing unit connected to the camera and a device designed to emit a specific point of light.

The invention also relates to a process to control the orientation in situ of a vehicle headlamp, wherein it includes the following operations:
  recording of successive images of a scene extending in front of the vehicle,
  processing of at least one image of the scene and production of a processed image,
  determination, from this processed image, of a horizon line (HL) of the scene,
  determination of a specific point (P) in the scene located at a pre-defined distance D from the horizon line,
  adjustment of the orientation of the headlamp until a point of light emitted by the lamp coincides with this specific point.

DETAILED DESCRIPTION OF EMBODIMENTS OF THE INVENTION

Figure 1:
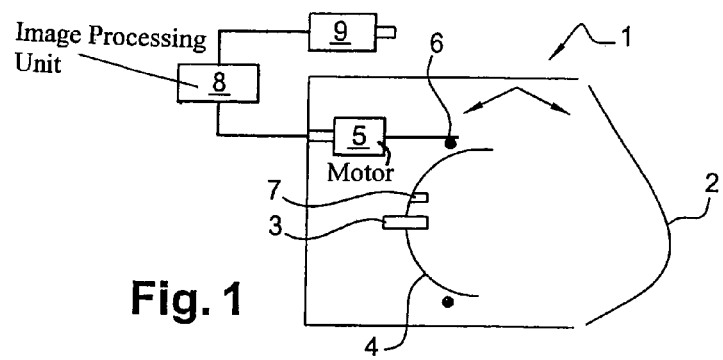
FIG. 1 illustrates a vehicle headlamp equipped with a control system according to the invention.

FIG. 1 illustrates a low-beam headlamp of a vehicle, equipped with an orientation control system according to the invention. More precisely, FIG. 1 shows a headlamp 1 fitted with a lens 2 (lamp closure glass possibly in conjunction with optical components such as lenses not shown) and a light source 3 mounted on a mobile support 4. This mobile support 4 is the reflector of the headlamp. This reflector 4 is actuated by a motor 5 associated with a rotation device 6, such as a ball joint. Inside the headlamp 1, arrows indicate the rotational movement of the reflector 4 and, notably, of the light source 3 integral with the reflector 4. This light source 3 can be a conventional light source for a vehicle headlamp. Similarly, the reflector 4, the lens 2, the motor 5 and the rotation device 6 can be conventional components as used in a low-beam headlamp for a vehicle.

The reflector 4 is also fitted with a second light source 7 which, as will be explained below, is a light source that emits a specific point of light. Like the light source 3, this light source 7, termed the specific point of light emission device, is integral with the reflector 4. It can therefore be displaced in an angular manner at the same time as the reflector 4 and the illumination source 3.

This angular displacement is accomplished by the motor 5 in relation to information received from an image processing unit 8. The latter is connected to a camera 9 which takes successive snapshots of the road scene extending in front of the vehicle. This camera can be a camera installed inside the vehicle, or outside the vehicle, solely in the context of the invention. According to the invention, it is also possible to use a camera already installed in the vehicle to perform other functions, such as route monitoring. This camera is, preferably, adapted for taking pictures at night. It can be an infrared camera, for example.

At least some of the images taken by the camera are transmitted to the image processing unit 8. As will be explained in detail below, this image processing unit 8 processes at least two of these images in order to determine the horizon line of the road scene. From this horizon line, the processing unit 8 determines a specific point to be illuminated and from this derives the angular displacements to be applied to the reflector 4. This angular displacement information is then transmitted to the motor 5 which uses the information to modify the position of the reflector 4.

In the embodiment illustrated in FIG. 1, the processing unit 8 includes a microcomputer. It is this microcomputer that determines the location of the specific point and the movements to be applied to the reflector. In another embodiment of the invention, it is the vehicle's own computer that is used to determine the specific point, etc. The image processing unit is then connected to this computer which is in turn connected to the motor 5.

FIG. 1 shows a device 7 designed to emit a specific point of light different from the light source 3. However, these two light sources can be combined, the specific light point in this case constituting a particular element of the light source 3. In this case, the specific light point participates in the illumination function of the headlamp.

For example, in the case of a headlamp with fluorescent diodes, one of the diodes can be used as the specific light point. In this case, the light beam emitted by this diode can be modulated and thus serve as a reference point.

In another example, it is possible to modulate the beam emitted by the light source 3, for example so that it produces a flashing effect which can then be referenced by the camera.

Throughout the following description, reference will be made to a specific light point. Clearly, this point can be replaced by any other type of figure such as for example luminous parallel lines which converge towards a point on the processed image.

Processing of the images taken by the camera 9 will now be described in detail with reference to example images. In particular, FIGS. 2A to 2D show, by means of a specimen road scene, the different steps in the process according to the invention.

Figure 2A:
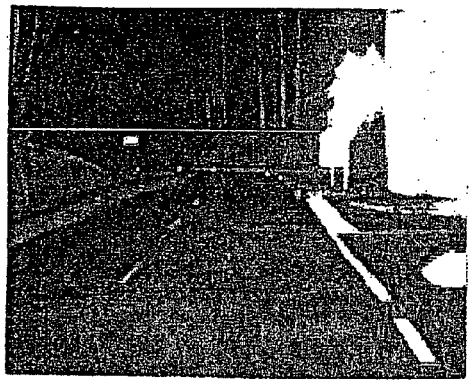
FIG. 2A illustrates a sample image of the road scene located in front of a vehicle.

FIG. 2A shows an example of an image taken by the camera 9. The image shown in this FIG. 2A is a natural image taken by the camera 9, that is to say an unprocessed image.

Figure 2B:
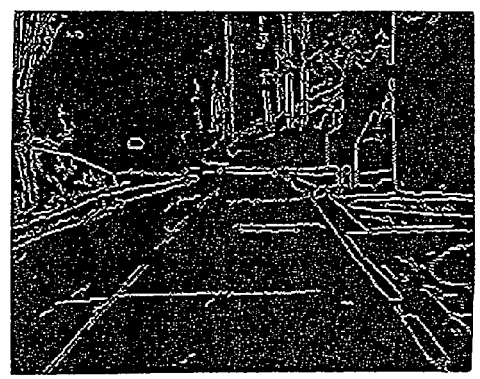
FIG. 2B illustrates the image in FIG. 2A after it has been processed.

FIG. 2B shows the same image as in FIG. 2A but after processing by the image processing unit 8. In an embodiment of the invention, this processing includes the following operations:

At least two natural images of the road scene taken by the camera are transmitted to the image processing unit. These images can be two successive images.

The processing unit performs a comparison on these natural images. In an embodiment of the process according to the invention, this comparison is a subtraction of one of the images relative to the other. This subtraction provides a means of identifying the constant zones, i.e. zones that are identical on the first and second images. In other words, the image obtained by subtraction of the two natural images shows up the zones which have moved, i.e. the zones and all elements associated with the speed of the vehicle.

The image processing unit then performs a thresholding operation on the image obtained by subtraction. This thresholding operation involves removing all greys from the image and replacing them by white or black depending on the initial greyscales. The processed image in FIG. 2B is then obtained.

In another embodiment of the invention, one image is processed by means of a mathematical transform applied to each pixel in the image or to all the pixels in the image. This mathematical transform can be the Hough transform, for example.

Figure 2C:
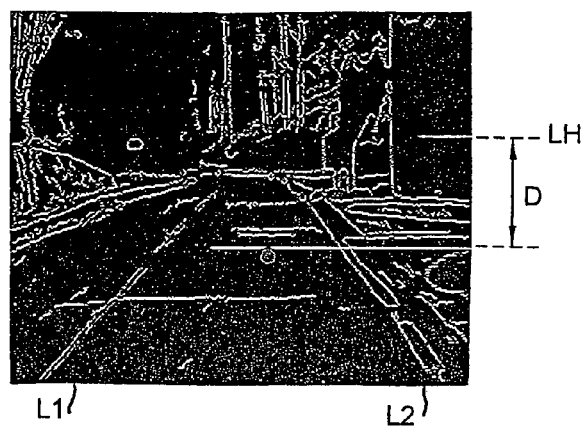
FIG. 2C illustrates the image in FIG. 2B on which the horizon, the distance D and the specific point have been marked.

The process according to the invention then proposes an examination of this image to identify the perspective lines and the points of convergence of these perspective lines. These perspective lines meet at the horizon. In this way, the horizon of the road scene is determined. In FIG. 2C, L1 and the L2 denote the perspective lines of the image. These two perspective lines meet at the horizon, at a point H. This point H is used to determine the location of the horizon line HL, which is horizontal and passes through this point H.

Figure 2D:
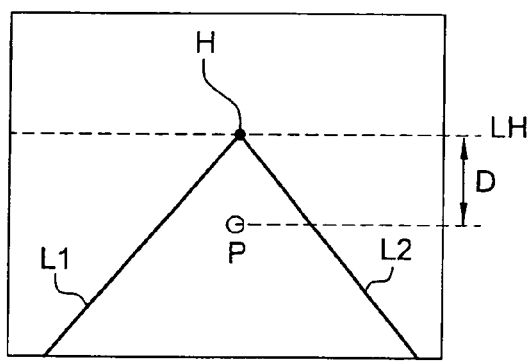
FIG. 2D illustrates the image in FIG. 2C in diagrammatic form showing the principal elements of implementation of the process.

FIG. 2D is a diagrammatic illustration of perspective lines L1 and L2 and their point of intersection H. This FIG. 2D is not an image actually obtained during image processing. It is merely a figure intended to facilitate understanding of the invention. FIG. 2D shows the principal elements recorded on the image in FIG. 2C and enables the rest of the process according to the invention to be applied.

When the horizon line HL has been determined, a distance D at which a specific point must be located is determined. This specific point constitutes a reference point which must be permanently present in the light beam of the headlamp. In effect, at the location of this specific point, the angle between the road and the light beam is substantially identical, irrespective of the attitude of the vehicle.

More precisely, it is considered that the position of the specific point must be located at a constant distance D from the horizon point H. To this end, the horizon line HL is taken as the starting point. By moving a distance D below this horizon line HL, and more precisely below the point H, the location of the specific point P is determined.

In practice, this distance D corresponds to a pre-defined and constant number of frame lines of the camera.

The position of the reflector 4 is then adjusted so that the impact of the point of light emitted by the specific light point emission device 7 is located at this position P. As the light source 3 of the headlamp is integral with the reflector 4, its light beam is automatically directed to the specific point P.

In FIGS. 2C and 2D, the specific point P is denoted by a small circle. In practice, this specific point is formed by the impact of the point of light emitted by the emission device 7. This specific light point can be a laser beam, or a beam emitted by an infrared diode or by a VC SEL diode. The specific light point can also be emitted by any other illumination device providing a luminous point of impact that is visible in the dark.

In practice, positioning of the light point at the location determined by the image processing unit is verified by means of the camera, i.e. by referencing the point of light impact on the images taken instantaneously by the camera.

The process according to the invention, as just described, makes it possible to maintain a constant distance relative to infinity, and within the plane, irrespective of the attitude of the vehicle. In this manner, the vehicle headlamp continuously provides the same illumination angle of the light beam relative to the road.

This process can be implemented in the general case of a relatively level road, as shown in FIGS. 2A to 2D. It can be implemented equally well in more particular cases, such as the bottom of a valley or at the top of a hill. In these cases, the process is implemented in the same manner as described above for a level road.

Figure 3:
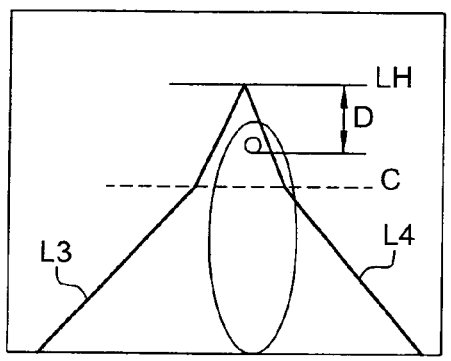
FIGS. 3, 4 and 5 illustrate particular cases in which the process according to the invention can also be implemented.

FIG. 3 illustrates the particular case of a road in the bottom of a valley. This case is illustrated diagrammatically, as in the previous example in FIG. 2D. The particular case illustrated in FIG. 3 is one where the vehicle is in the bottom of a valley and is about to start the ascent of a hill or mountain side. In this example, the area located below the dotted line C shows the part of the road in the valley bottom and which forms the perspective lines L3 and L4. At the dotted line C, the perspective lines L3 and L4 break, that is to say they form a non-plane angle with the initial perspective lines. This break in the perspective lines represents the point where the road starts to rise, i.e. where the road slopes relative to the level part of the road in the valley bottom. Despite this break in the perspective lines, it can be seen in FIG. 3 that the horizon line HL is determined in the same way as in FIG. 2. When this horizon line HL has been determined, it is possible to determine the location of the specific point P at a distance D below this line HL.

Figure 4:
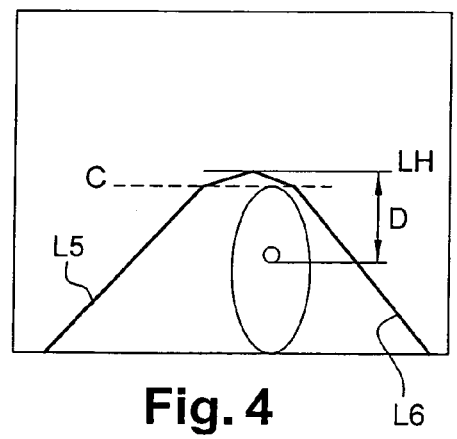

FIG. 4 is a diagrammatic illustration of the particular case of a vehicle at the top of a hill. In this case, the vehicle is at the top of a hill and is about to enter a level or downhill section of the road. As can be seen in FIG. 4, the perspective lines L5 and L6 of the hill road, i.e. that part of the perspective lines below the dotted line C, are broken at this line C. As previously, perspective lines L5 and L6 meet at the horizon point located above line C, and the position of the specific point is then determined at a distance D below the horizon line HL.

It will thus be understood that, irrespective of the geometry of the road on which the vehicle is travelling, the horizon line is always determinable with reference to the perspective lines, whether it is level or sloping. Once the horizon line has been determined, the location of the specific point can in turn be determined.

In each of the FIGS. 3 and 4, the illumination range of the vehicle headlamp is denoted by an oval. It is to be understood that, depending on the geometry of the road, the range of the headlamps can be different but the angle of illumination of the light beam relative to the road remains identical. The invention thus makes it possible to anticipate variations in the road profile.

Figure 5:
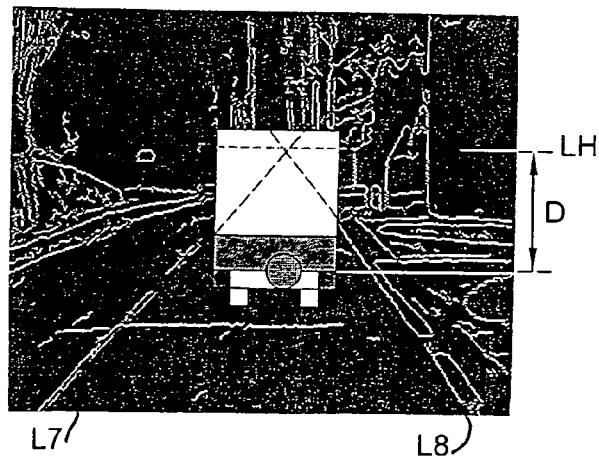

FIG. 5 illustrates a particular situation in which a vehicle can be found. This situation is that in which another vehicle, in particular a vehicle of relatively large size such as a heavy goods vehicle, is travelling on the road in front of the vehicle in question. FIG. 5 shows the image obtained after processing, in such a situation. In this case, the truck has obstructed the taking of images of the road scene. Also, the image obtained after processing includes only part of the perspective lines L7 and L8. However, with this part of the perspective lines detected, between the truck and the vehicle, it is possible to extrapolate the rest of these perspective lines, then to determine the horizon line HL using these extrapolated perspective lines. As a variant, the horizon line HL can be determined in relation to extrapolated perspective lines L7 and L8 and also taking into account the dimensions of the specific light point.

It is thus possible to perform a realistic correction of the image. The data obtained by extrapolation are of course less precise than those obtained in the cases described above. However, in relation to the impact dimensions of the specific light point, it is possible to determine the error associated with the presence of the truck.

The system of the invention described above can be fitted on all types of vehicles whether or not they are equipped with a camera. It can be fitted in particular on vehicles already equipped with a camera, and notably an infrared camera used for night vision.

Similarly, the system of the invention can be implemented in a vehicle equipped with an on-board computer. The image processing unit can then be integrated into the vehicle's on-board computer. In this case, all that is required is to incorporate suitable software into the on-board computer to facilitate image processing using the images produced by the camera and to control the motor which actuates the headlamp reflector. The cost of this control system is then virtually imperceptible for the manufacturer. On the other hand, an image processing unit, with or without a microcomputer, can be added to the vehicle.

The system of the invention can also be associated with a GPS and a mapping system to determine vertical variations at ground level and thus anticipate the required headlamp control settings.

What is claimed is:

1. System for in-situ control of the orientation of a vehicle headlamp equipped with a light source fixed on a mobile reflector, which includes a camera mounted in the vehicle and observing a road scene extending in front of the vehicle, an image processing unit connected to the camera, and producing a processed image of the scene extending in front of the vehicle, means for determining from this processed image a horizon line of the road scene extending in front of the vehicle, means for determining a specific point in the road scene located at a predetermined distance from the horizon line, means for emitting a point of light in the road scene extending in front of the vehicle, and means for adjusting the orientation of the headlamp until the point of light coincides with this specific point.

2. Control system according to claim 1, wherein the specific light point emission device is mounted on the reflector.

3. Control system according to claim 1, wherein the specific light point emission device is a laser beam source.

4. Control system according to claim 1, wherein the specific light point emission device is an infrared diode or a VC SEL diode.

5. Control system according to claim 1, wherein the camera is an infrared camera.

6. Process for in-situ control of the orientation of a vehicle headlamp, which includes the following operations:

recording of images of a road scene extending in front of the vehicle, processing of at least one image of the road scene and production of a processed image, determination, from this processed image, of a horizon line of the road scene, determination of a specific point in the road scene located at a pre-defined distance from the horizontal line, adjustment of the orientation of the headlamp until a point of light emitted by the headlamp coincides with the specific point.

7. Control process according to claim 6, wherein the light point emitted by the headlamp is different from a light beam illuminating the road scene.

8. Control process according to claim 6, wherein the image processing operation involves processing at least two images in order to produce a processed image.

9. Control process according to claim 8, wherein the two-image processing operation involves subtracting one image from the other.

10. Control process according to claim 9, wherein the two-image processing operation involves the performance of a threshold operation on the image obtained after subtraction.

11. Control process according to claim 6, wherein the operation to determine a horizon line involves determining perspective lines in the processed image and deriving the horizontal line from these.

12. Control process according to claim 6, wherein the pre-defined distance is constant.

13. Control process according to claim 6, wherein the pre-defined distance corresponds to a number of frame lines of a camera.

14. Control process according to claim 6, wherein the horizon line is extrapolated in relation to perspective lines and dimensions of the light point.

15. Vehicle headlamp including a mobile reflector actuated by a motor, and a light source fixed on the reflector, wherein in-situ orientation of the headlamp is controlled by the control system according to claim 1.

* * * * *